US009515914B2

(12) United States Patent
Vasseur et al.

(10) Patent No.: US 9,515,914 B2
(45) Date of Patent: Dec. 6, 2016

(54) PATH COMPUTATION ELEMENT PROXYING FOR DETERMINISTIC WIRELESS NETWORKS

(71) Applicant: Cisco Technology, Inc., San Jose, CA (US)

(72) Inventors: Jean-Philippe Vasseur, Saint Martin d'Uriage (FR); Pascal Thubert, La Colle sur Loup (FR); Patrick Wetterwald, Mouans Sartoux (FR)

(73) Assignee: Cisco Technology, Inc., San Jose, CA (US)

( * ) Notice: Subject to any disclaimer, the term of this patent is extended or adjusted under 35 U.S.C. 154(b) by 148 days.

(21) Appl. No.: 14/038,120

(22) Filed: Sep. 26, 2013

(65) Prior Publication Data

US 2015/0023205 A1    Jan. 22, 2015

Related U.S. Application Data

(60) Provisional application No. 61/856,697, filed on Jul. 20, 2013.

(51) Int. Cl.
*H04L 12/28* (2006.01)
*H04L 12/751* (2013.01)
*H04L 12/717* (2013.01)

(52) U.S. Cl.
CPC ............... *H04L 45/02* (2013.01); *H04L 45/42* (2013.01)

(58) Field of Classification Search
CPC .................................. H04L 45/02; H04L 45/42
USPC ........................................................ 370/254
See application file for complete search history.

(56) References Cited

U.S. PATENT DOCUMENTS

| 7,428,221 | B2 | 9/2008 | Thubert et al. | |
|---|---|---|---|---|
| 7,668,119 | B2 | 2/2010 | Thubert et al. | |
| 8,085,686 | B2 | 12/2011 | Thubert et al. | |
| 8,131,873 | B2* | 3/2012 | Vasseur | H04L 45/04 709/203 |
| 8,254,272 | B1 | 8/2012 | Vasseur | |
| 2003/0072485 | A1* | 4/2003 | Guerin | H04L 41/12 382/166 |
| 2006/0098657 | A1 | 5/2006 | Vasseur et al. | |
| 2006/0101142 | A1* | 5/2006 | Vasseur et al. | 709/225 |
| 2006/0176828 | A1* | 8/2006 | Vasseur | H04L 41/0677 370/252 |

(Continued)

OTHER PUBLICATIONS

Farrel, et al., "A Path Computation Element (PCE)-Based Architecture", The Internet Society, Network Working Group, Request for Comments 4655, Aug. 2006, 41 pages.

(Continued)

*Primary Examiner* — Faisal Choudhury
(74) *Attorney, Agent, or Firm* — Parker Ibrahim & Berg LLC; James M. Behmke; Stephen D. LeBarron

(57) ABSTRACT

In one embodiment, an agent device discovers a set of path computation elements (PCEs) and corresponding available capabilities and resources, and determines particular capabilities and resources of interest in a particular computer network. Upon building a simplified view of the available capabilities and resources of the set of PCEs based on the particular capabilities and resources of interest, the agent device advertises the simplified view of the available capabilities and resources into the particular computer network.

21 Claims, 7 Drawing Sheets

(56) References Cited

U.S. PATENT DOCUMENTS

| | | | | |
|---|---|---|---|---|
| 2007/0217419 | A1* | 9/2007 | Vasseur | H04L 12/66 370/392 |
| 2012/0051211 | A1* | 3/2012 | Budampati | H04L 41/0659 370/217 |
| 2012/0236824 | A1* | 9/2012 | McCann | H04L 47/20 370/331 |
| 2013/0170431 | A1* | 7/2013 | Mann | H04M 15/66 370/328 |
| 2013/0254195 | A1* | 9/2013 | Chen | H04L 47/122 707/736 |
| 2013/0311672 | A1* | 11/2013 | Chastain | H04L 67/143 709/238 |
| 2013/0336108 | A1 | 12/2013 | Vasseur et al. | |
| 2013/0336159 | A1 | 12/2013 | Previdi et al. | |

OTHER PUBLICATIONS

Gnawali, et al., "The Minimum Rank with Hysteresis Objective Function", Request for Comments 6719, Sep. 2012, 13 pages, Internet Engineering Task Force Trust.

Le Roux, et al., "OSPF Protocol Extensions for Path Computation Element (PCE) Discovery", Network Working Group, Request for Comments 5088, Jan. 2008, 20 pages, Internet Engineering Task Force Trust.

Le Roux, et al., "IS-IS Protocol Extensions for Path Computation Element (PCE) Discovery", Network Working Group, Request for Comments 5089, Jan. 2008, 17 pages, Internet Engineering Task Force Trust.

Thubert, P., "Objective Function Zero for the Routing Protocol for Low-Power and Lossy Networks (RPL)", Request for Comments 6552, Mar. 2012, 14 pages, Internet Engineering Task Force Trust.

Vasseur, et al., "Path Computation Element (PCE) Communication Protocol (PCEP)", IETF Trust, Network Working Group, Request for Comments 5440, Mar. 2009, 87 pages.

Vasseur, et al., "Routing Metrics Used for Path Calculation in Low-Power and Lossy Networks", Request for Comments 6551, Mar. 2012, 30 pages, Internet Engineering Task Force Trust.

Vasseur, et al., "Path Determination Agent(s) and Methods Especially for Use in Deterministic Networks", U.S. Appl. No. 61/856,697, filed Jul. 20, 2013, 10 pages, United States Patent and Trademark Office, Alexandria, VA.

Winter, et al., "RPL: IPv6 Routing Protocol for Low-Power and Lossy Networks", Request for Comments 6550, Mar. 2012, 157 pages, Internet Engineering Task Force Trust.

* cited by examiner

PATH COMPUTATION ELEMENT PROXYING FOR DETERMINISTIC WIRELESS NETWORKS

RELATED APPLICATION

The present application claims priority to U.S. Provisional Application No. 61/856,697, filed Jul. 20, 2013, by Vasseur et al., the contents of which are hereby incorporated by reference.

TECHNICAL FIELD

The present disclosure relates generally to computer networks, and, more particularly, to path computation element (PCE) proxying, especially for deterministic wireless networks.

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability, etc.

As more and more uses for LLNs are being deployed, such as in the industrial space, determinism of the network communications and their standardization is becoming a primary point of focus within the networking community. In particular, deterministic networking refers to networks that can guarantee the delivery of packets within a bounded time. Generally, this relates to achieving characteristics such as guaranteed delivery, fixed latency, and jitter close to zero (e.g., micro seconds to tens of milliseconds depending on application). Achieving these characteristics within the architecture of an LLN, however, is not trivial, due to the constrained nature of LLNs.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, an agent device discovers a set of path computation elements (PCEs) and corresponding available capabilities and resources, and determines particular capabilities and resources of interest in a particular computer network. Upon building a simplified view of the available capabilities and resources of the set of PCEs based on the particular capabilities and resources of interest, the agent device advertises the simplified view of the available capabilities and resources into the particular computer network.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

Figure 1:
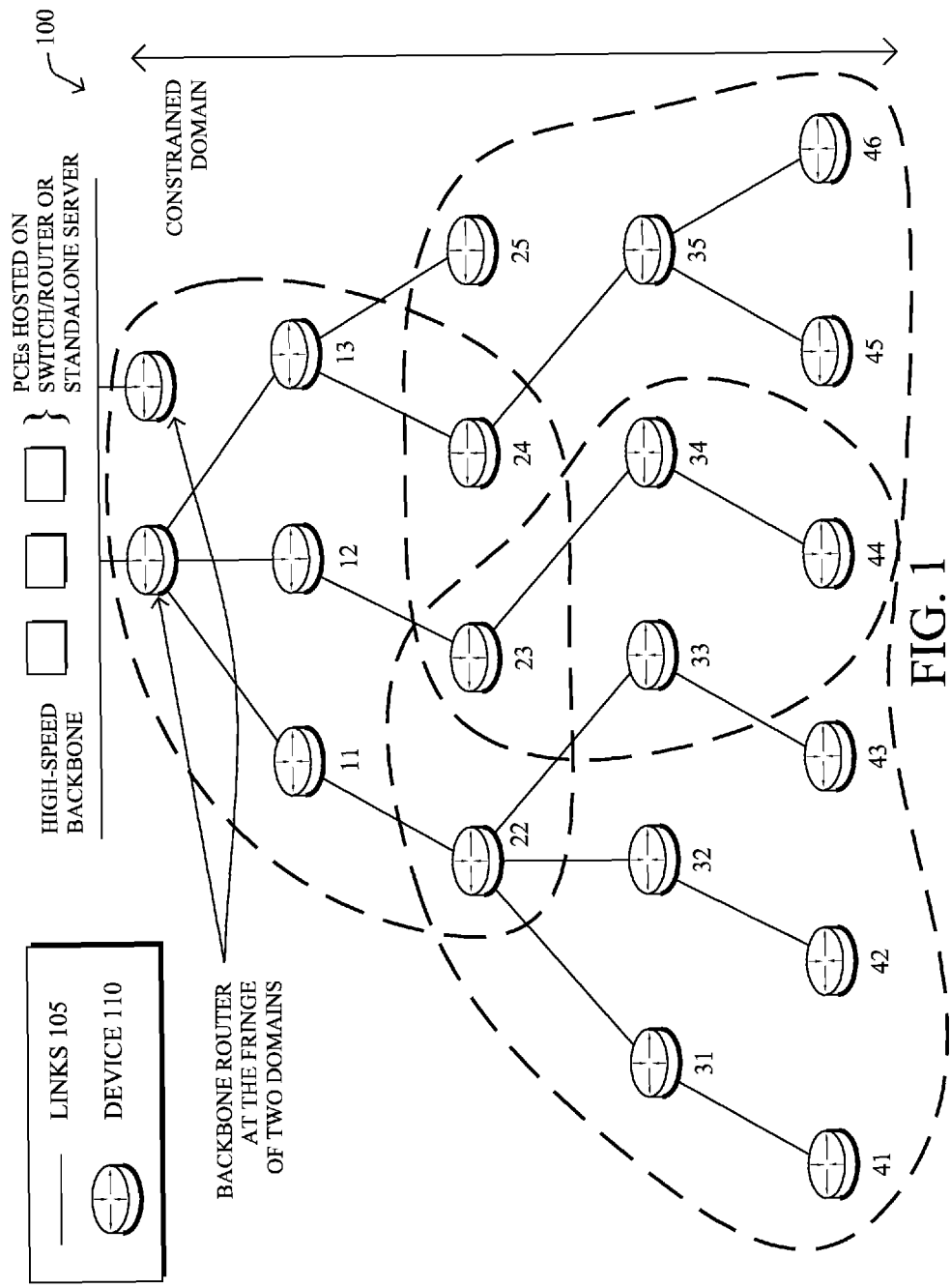
FIG. 1 illustrates an example communication network.

FIG. 1 is a schematic block diagram of an example computer network 100 illustratively comprising nodes/devices 110 (e.g., labeled as shown, "backbone," "11," "12," . . . "46," and described in FIG. 2 below) interconnected by various methods of communication. For instance, the links 105 may be wired links or shared media (e.g., wireless links, PLC links, etc.) where certain nodes 110, such as, e.g., routers, sensors, computers, etc., may be in communication with other nodes 110, e.g., based on distance, signal strength, current operational status, location, etc. Also, as shown, the backbone devices may connect the nodes of the network to a backbone network, such as via a dedicated wireless link or wired connection, where the backbone network may be proprietary and/or public (e.g., the Internet), and may contain various resources such as servers, switches, routers, etc. Those skilled in the art will understand that any number of nodes, devices, links, etc.

may be used in the computer network, and that the view shown herein is for simplicity. Also, those skilled in the art will further understand that while the network is shown in a certain orientation, particularly with a "root" backbone node, the network 100 is merely an example illustration that is not meant to limit the disclosure.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
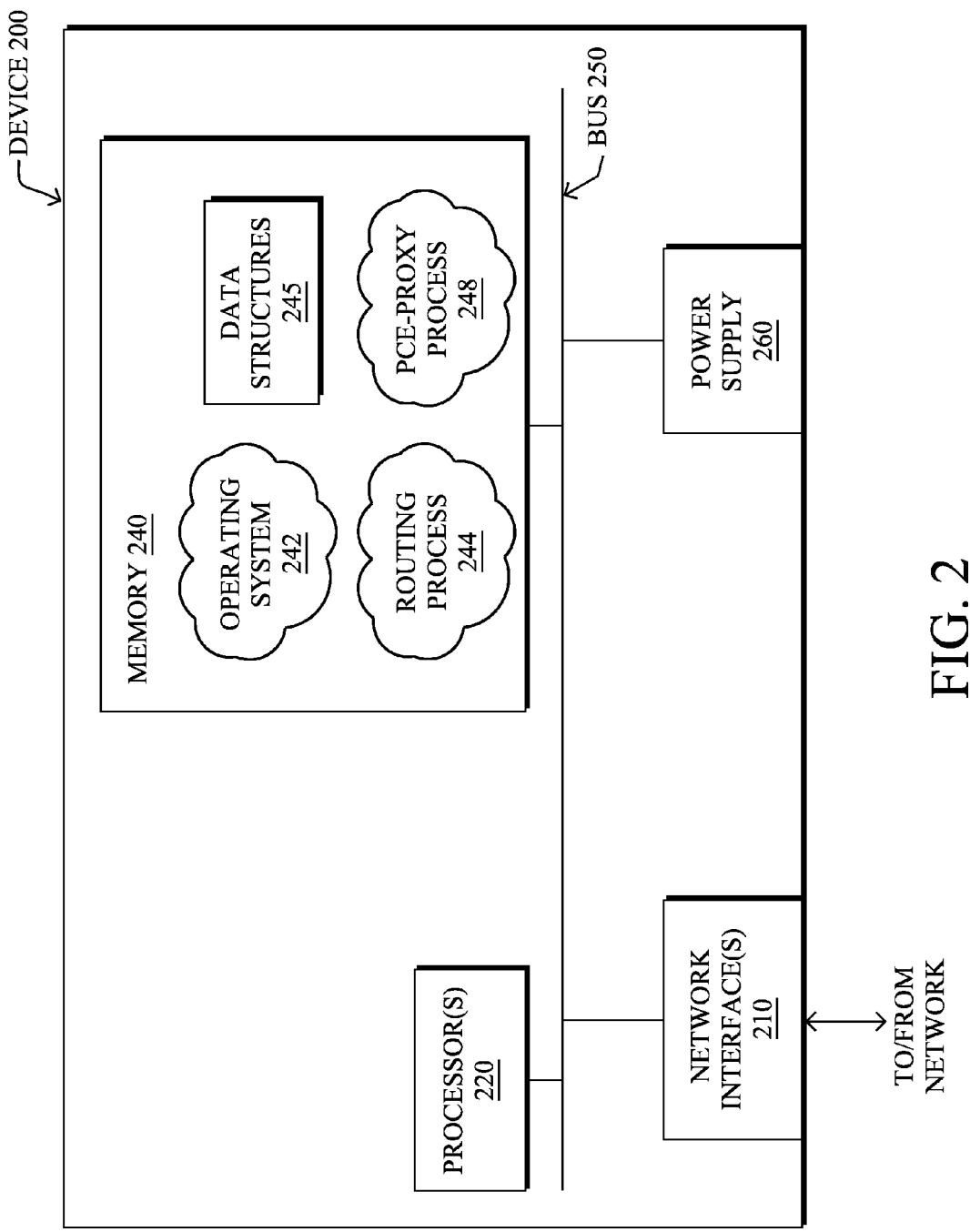
FIG. 2 illustrates an example network device/node.

FIG. 2 is a schematic block diagram of an example node/device 200 that may be used with one or more embodiments described herein, e.g., as any of the nodes 110 or servers (e.g., path computation elements or "PCEs") shown in FIG. 1 above. The device 200 may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244, and an illustrative "PCE-proxy" process 248 as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive (or reactive) routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" (or "Internet of Everything") network. Loosely, the term "Internet of Things" or "IoT" (or "IoE") may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges (and/or vertices) are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, in certain embodiments, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built (e.g., by routing process 244) based on an Objective Function (OF). The role of the Objective Function is generally to specify rules on how to build the DAG (e.g. number of parents, backup parents, etc.).

In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, expected transmission count (ETX), etc., while example constraints that may be placed on the route selection may comprise various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs). Notably, an example for how routing metrics and constraints may be obtained may be found in an IETF RFC, entitled "Routing Metrics used for Path Calculation in Low Power and Lossy Networks"<RFC 6551> by Vasseur, et al. (March 2012 version). Further, an example OF (e.g., a default OF) may be found in an IETF RFC, entitled "RPL Objective Function 0"<RFC 6552> by Thubert (March 2012 version) and "The Minimum Rank Objective Function with Hysteresis"<RFC 6719> by O. Gnawali et al. (September 2012 version).

Building a DAG may utilize a discovery mechanism to build a logical representation of the network, and route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state. In addition, RPL also specifies a message called the DIS (DODAG Information Solicitation) message that is sent under specific circumstances so as to discover DAG neighbors and join a DAG or restore connectivity.

Figure 3:
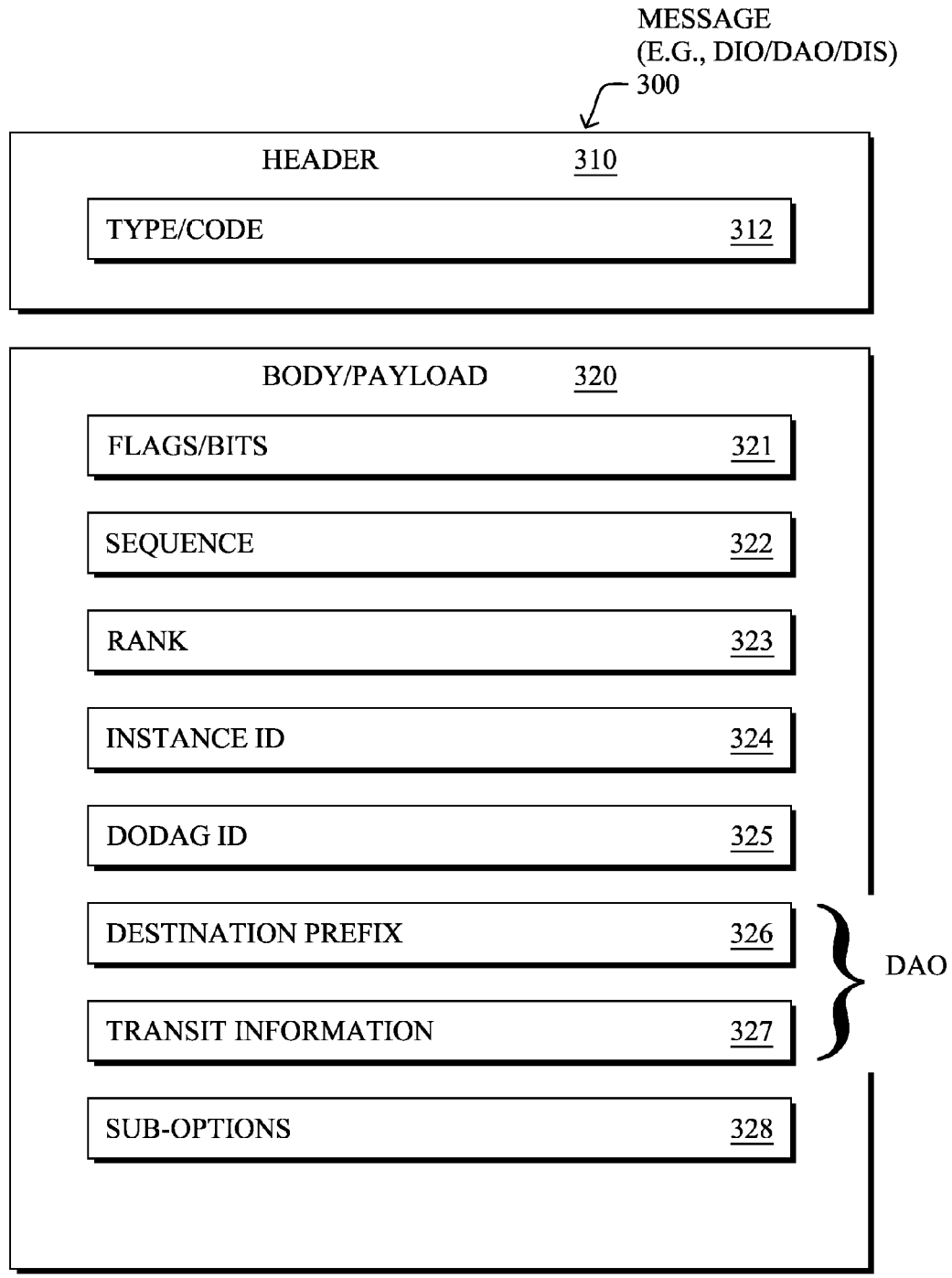
FIG. 3 illustrates an example routing protocol message format.

FIG. 3 illustrates an example simplified control message format 300 that may be used for discovery and route dissemination when building a DAG, e.g., as a DIO, DAO, or DIS message. Message 300 illustratively comprises a header 310 with one or more fields 312 that identify the type of message (e.g., a RPL control message), and a specific code indicating the specific type of message, e.g., a DIO, DAO, or DIS. Within the body/payload 320 of the message may be a plurality of fields used to relay the pertinent information. In particular, the fields may comprise various flags/bits 321, a sequence number 322, a rank value 323, an instance ID 324, a DODAG ID 325, and other fields, each as may be appreciated in more detail by those skilled in the art. Further, for DAO messages, additional fields for destination prefixes 326 and a transit information field 327 may also be included, among others (e.g., DAO_Sequence used for ACKs, etc.). For any type of message 300, one or more additional sub-option fields 328 may be used to supply additional or custom information within the message 300. For instance, an objective code point (OCP) sub-option field may be used within a DIO to carry codes specifying a particular objective function (OF) to be used for building the associated DAG. Alternatively, sub-option fields 328 may be used to carry other certain information within a message 300, such as indications, requests, capabilities, lists, notifications, etc., as may be described herein, e.g., in one or more type-length-value (TLV) fields.

Notably, industrial communication systems deployed today mostly use serial communications (most of them being proprietary) between sensors/actuators and a Programmable Logic Controller. Ethernet communication is also widely used for process and discrete manufacturing. For example, many SCADA (supervisory control and data acquisition) systems use Ethernet communication technologies to communicate with the Programmable Logic Controllers.

Recently with the emergence of new wireless technologies like IEEE 802.11, IEEE 802.15.4, it is becoming increasingly efficient and easy to deploy new sensors/actuators on a factory assembly line at a very low cost (e.g., no need to add wire/cable, no wire cuts, etc.), and to deploy new monitoring applications in an economically viable fashion (e.g., vents, corrosion), adding new capabilities such as automated matching flow meters along a pipe for leak detection, or lighting based on human presence for power saving, as well as allowing for applications with rotating devices, moving cranes, robots arms, or mobile handheld devices. Monitoring applications represent orders of magnitude more sensors than traditional control loops and the number of new wireless connected device deployments is growing exponentially. These new technologies have gained in robustness, stability, and security, making these deployments feasible.

However, customer requirements in the industrial space are focusing on the determinism of the network communications and their standardization, particularly since industrial networking generally requires having predictable communications between devices (e.g., a refinery's processing controls), as well as other applications, such as inflight control systems, internal vehicle connectivity, and so on. As noted above, deterministic networking refers to networks that can guarantee the delivery of packets within a bounded time. This generally translates to the following characteristics:

Guarantee of delivery;
Fixed latency; and
Jitter close to zero (micro seconds to 10 s of milliseconds depending on application).

Typically, two methods are used to meet these requirements:
Quality of Service (QOS) and 802.1Q mechanisms; and
Time scheduled mechanisms.

Both methods may be used for Ethernet or Wireless technologies. There are also techniques that combine QOS technologies with time schedules (e.g., emissions of packets on the different QOS queues being triggered by a schedule-based gate mechanism). Achieving these characteristics within the architecture of an LLN, however, is not trivial, due to the constrained nature of LLNs.

In an example embodiment, Deterministic Ethernet or Deterministic Wireless based on time-scheduled mechanisms require that all the nodes being part of a path are to be time synchronized. Each packet forwarding is then regulated by a time schedule that specifies when this specific packet has to be transmitted to the wire or the radio and this continues for each node on the path. This specific time period is called a time slot. An external box (called orchestrator) usually does the computation of this path and the associated timetable. When the computation is done, the path and the time table is then pushed to every node participating in the forwarding, such that they can receive and transmit the packet according to the schedule. In the case of Deterministic Wireless, many systems used channel-hopping functionality, and the timetable in this case should define the time slot and the frequency channel to use. Illustratively, for the 802.15.4 protocol, a specific extension to the standard has been defined: 802.15.4e "Time Slotted Channel Hopping" (TSCH). TSCH is a medium access technique, which uses time synchronization to achieve ultra low-power operation and channel hopping to enable high reliability. The Time-Slotted aspect of the TSCH technology is a Time Division Multiplexing (TDM) technique, which requires all nodes in the network to be time synchronized. Time is sliced up into time slots, which are long enough for a MAC frame of maximum size to be sent from mote (node) B to mote A, and for mote A to reply with an acknowledgment (ACK) frame indicating successful reception.

In addition, path computation elements (PCEs), as defined, for example, in the Internet Engineering Task Force's Request for Comment (RFC) 4655, generally consist of relying on an external engine (PCE) responsible for the computation of paths or tunnels in the network (e.g., a computational entity that can be hosted on a router or external server). Head-ends (or Path Computation Clients—PCCs) may send requests to PCEs (PCReq messages) using a PCEP signaling protocol (RFC 5440), and receive computed paths thanks to replies (PCRep messages). PCEP supports a variety of complex messages with priority, attributes, constraints, etc., along with IGP-based PCE discovery using OSPF and ISIS of static and dynamic attributes. Various algorithms (usually not standardized) have been specified for PCE selection and load balancing. Two forms of PCE exist: (1) Stateless (computation of paths/tunnels is memory-less and the PCE does not maintain LSP states but simply the TED (Traffic Engineering Database) for the majority of the cases; and (2) stateful where the PCE also maintains the LSP's state, which provides more optimum path computation (avoiding double booking allocation, allowing for global optimization, etc.) at the cost of additional complexity. Inter-PCE path computation has also been specified to handle the case where a single PCE would not have complete visibility of the routing domain, thus requiring some form of collaboration between PCEs to compute a path/tunnel, while preserving confidentiality between routing domains.

Notably, the PCE has generally been specified for high-bandwidth networks, such as core service provider networks. As such, PCE protocols and various mechanisms (e.g., signaling required for PCE discovery, PCC-PCE signaling protocols such as PCEP, etc.) have typically been quite heavy in terms of control plane overhead and various state maintenance. Although the overall architecture is preserved, the use of a PCE-based architecture for Deterministic Wireless requires a number of enhancements, such as new protocols and algorithms and mechanisms to operate in the highly constrained environments of LLNs, as discussed above. Furthermore the PCE has been designed to compute paths, though in the context of Deterministic Wireless, what is required is not only to compute paths, but also time slot allocation (in others words, knowing the traffic matrix, paths, and time slot allocation is intimately coupled, which changes the paradigm of routing and network operations, introducing new issues that require new mechanisms).

PCE Proxying

One of the major challenges in PCE-based architecture lies in the PCE discovery and signaling interaction between a client (Path Computation Client—PCC) and the PCE. In IP/MPLS networks, PCE discovery is simply handled thanks to IGP discovery (OSPF or ISIS) since this adds minor overhead in terms of network resources consumption, which contrasts with the constrained nature of LLNs. Furthermore, since the PCE is central to the proper operation of PCE-based network using Deterministic Wireless, it becomes critical to design a robust solution ensuring that each node in the network will automatically discover a set of PCEs, while limiting the required control plane overhead should a large number of PCEs be available. In addition, signaling between nodes and PCEs produces churns of traffic as PCEs become unavailable, and different networks have different characteristics and functions that are not suitable for a more generic approach (especially when resources are dynamic).

Accordingly, in contrast with existing PCE discovery techniques, the techniques herein provide an architecture where constrained nodes in an IoT domain interact with a limited number of proxies that have the visibility of dynamically discovered PCE thanks to dynamic advertisements. The proxy (or proxies) may "hide" the PCE(s) and instead present an aggregated view of the path computation element resources to constrained nodes, but also redirect received path computation requests to the appropriate PCE(s), for example, after processing PCE selection (optionally after light analysis of the request), thus dramatically simplifying the PCE selection process, while reducing the required bandwidth for PCE advertisement and also PCC-PCE interactions.

Specifically, according to one or more embodiments of the disclosure as described in detail below, an agent device (proxy) discovers a set of PCEs and corresponding available capabilities and resources, and determines particular capabilities and resources of interest in a particular computer network. Upon building a simplified view of the available capabilities and resources of the set of PCEs based on the particular capabilities and resources of interest, the agent device advertises the simplified view of the available capabilities and resources into the particular computer network.

Illustratively, the techniques described herein may be performed by hardware, software, and/or firmware, such as in accordance with the PCE-proxy process 248, which may contain computer executable instructions executed by the processor 220 (e.g., particularly of a backbone device, such as a root, FAR, etc.) to perform functions relating to the techniques described herein, e.g., in conjunction with other processes. For example, the techniques herein may be treated as extensions to conventional protocols, such as the various PCE/PCC protocols and/or routing protocols, and as such, may be processed by similar components understood in the art that execute those protocols.

Figure 4:
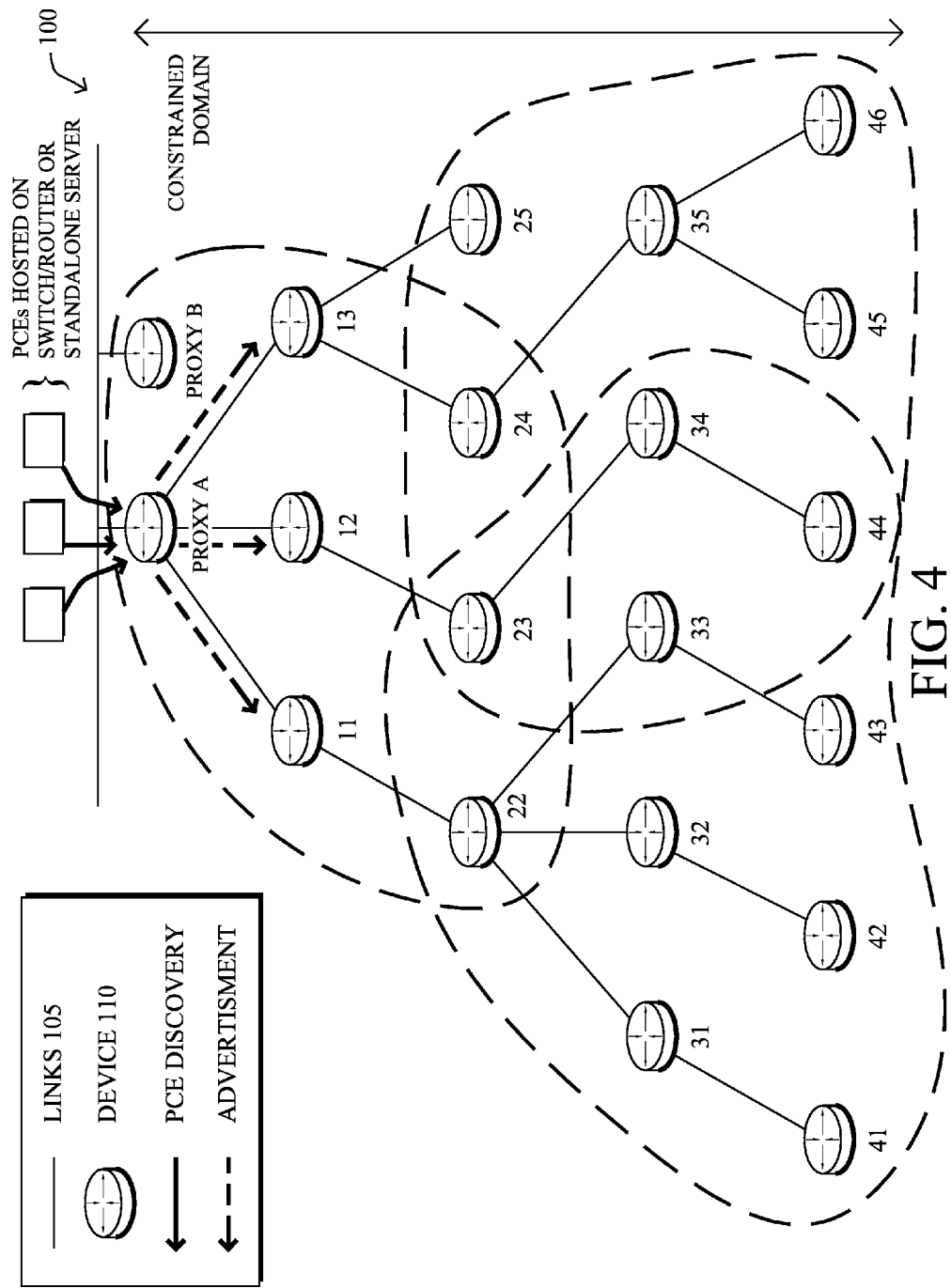
FIG. 4 illustrates an example of path computation element (PCE) proxying.

Operationally, the techniques herein employ the use of a proxy architecture to reduce the PCE discovery and the signaling control plane. Note again that PCE discovery and routing of signaling requests are potentially extremely costly in Deterministic Wireless Networks, thus the conventional PCE approach is not suitable in such a constrained environment. Accordingly, with reference to FIG. 4, the techniques herein effectively make use of proxy-agents ("proxy" or "agent device"), such as proxy A and B, that hide the actual locations, capabilities, and states of the PCEs to the LLN devices 110, but also act as a protocol converter to adapt a generic PCE view to the particular characteristics of the LLN, and as a load balancer proxy or relay agent for PCE discovery as explained below.

A first aspect of the techniques herein consists in aggregating the PCE states (location, identity, capability, resources available, etc.) from various sources of discovery (including IGP discovery). For example, in a typical configuration for deployment, the backbone router is connected to a higher speed network to the PCEs, and as such, the discovery of the PCEs on the high bandwidth area of the network may be aggregated. During this phase, the proxy/agent (hosted on the backbone router) discovers the set of PCEs and makes a conversion of the capabilities and resources of interest for the attached LLN. For example, the agent device (e.g., proxy A) would learn from IGP discovery the list of available PCEs, their capabilities, available resources, and so on, and builds an aggregated view of the PCEs of interest for the LLN (e.g., one, all, or a subset of the PCEs).

In one embodiment, such resources could be mapped into the routing protocol used in the LLN. For example, the agent, possibly hosted in the backbone router, could learn that a (sub)set of the PCEs are of interest (having to proper capabilities, sufficient resources, etc.), and may decide to "leak" (i.e., advertise) the (sub)set of PCEs into a routing advertisement used in the LLN (e.g., a TLV specified for the routing protocol RPL carried within the DIO message, as mentioned above).

More sophisticated mapping and advertisements capabilities may also be used. For instance, in another embodiment, PCE capabilities (static and dynamic) are mapped after being filtered out and/or aggregated. For example, if the agent detects that certain PCEs with specific capabilities of interest are available, it may build one advertisement for the aggregated PCE resource, which would significantly simplify the processing on the constrained nodes and the number of messages flooded in the LLNs. The notion of filtering can be used to hide the actual real-time resources of the PCEs in order to limit the control traffic in the LLN. In addition, the notion of "blurring" can be used to abstract and generalize certain characteristics of the LLN (e.g., in a TSCH network, the way the bandwidth is allocated in time slots, leaving some work for the agent to specify the exact time slots that match an abstract bandwidth request by a PCE). Regular updates on PCE available resources (e.g., average computing time) may also be hidden by the proxy to the end nodes, thus limiting the advertisements in the constrained network.

Notably, as used herein, an "aggregated view" or "simplified view" implies a list, table, or other information data structure that is in a reduced form than providing all available information, and thus "view" does not mean to imply any visible aspects. In other words, a simplified view is a simplification, reduction, and/or aggregation of information advertised to the nodes of the network, as described herein. For example, assuming that PCEs advertise capabilities X, Y, and Z, and the LLN is only interested in X and Y, than a "simplified view" of X, Y, and Z is merely X and Y. As another example, if a PCE "1" advertises capabilities A and B, a PCE "2" advertises capabilities B, C, and D, and a PCE "3" advertise capabilities A, C, and E, a "simplified view" could simply be "A, B, C, D, E" without noting the specific PCEs 1, 2, or 3. Further, as mentioned, a "simplified view" may involve filtering updates, such as a resource X only being advertised as a changed amount only after a certain amount of time, or in response to changes greater than a configured threshold, and so on. Any combinations of simplifications (aggregations, reductions, filters, etc.) are available within the understanding of a "simplified view" as described herein, and those specifically mentioned herein are not meant to limit the disclosure.

Figure 5:
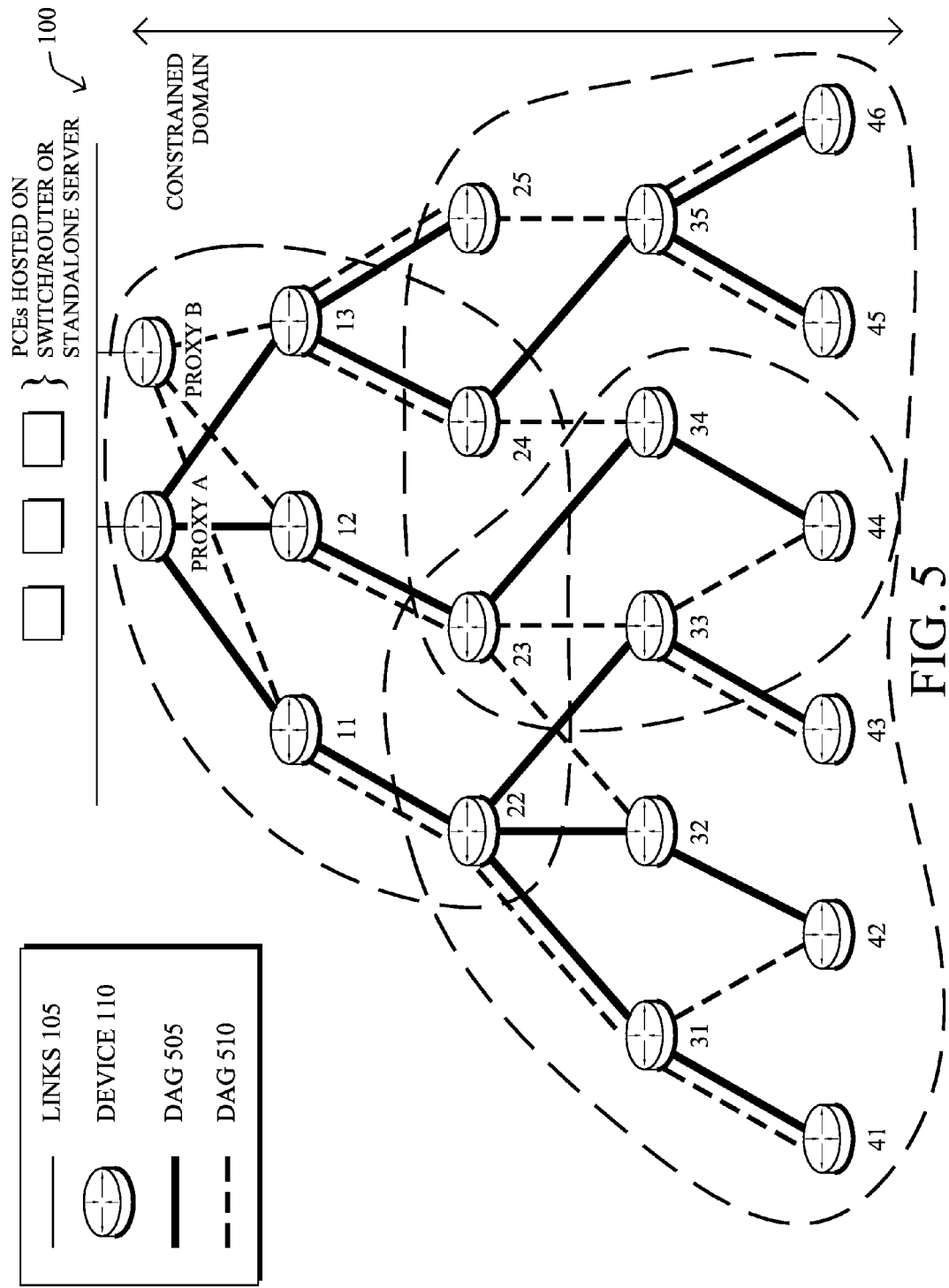
FIG. 5 illustrates an example of directed acyclic graphs (DAGs)

A second aspect of the techniques herein relates to the use of a plurality of available agents by the constrained nodes 110 in the LLNs. As depicted in FIG. 5, a node may discover N agents, which may each belong to a specific DAG (505/510) built by a protocol such as RPL. For instance, in this example, each node could join N DAGs and discover one agent per DAG advertising a Virtual PCE (aggregated PCE resource). Notably, the DAGs 505 and 510 may be the same (other than the agent as the root), or may be different, such as being built with the same OF or different OF, respectively.

Upon detecting the need to have a new resource/path computed by the PCE, a node may then send its request to a selected agent, which would in turn appropriately adapt and "dispatch" the request to an appropriate PCE, such as after running a more sophisticated PCE selection algorithm. Note that in one embodiment, the proxy may simply redirect the request, while in another embodiment, the proxy may perform a simple processing of the request to better select the most appropriate PCE. For example, one use case is when the PCEs share a space, but each one is responsible for a piece of geography. Based on the location or neighbors of a node, the proxy may prefer the PCE that already "represents" that area, and then could redistribute the requests if one particular PCE is overloaded. In that case the proxy acts as a "PCE load balancer".

Also, in one embodiment, the proxy/agent may illustratively replace the destination of the request (PCE Request) with the selected PCE and origin of the reply (PCE Reply) with the computed PCE. In yet another embodiment, the proxy may also not provide the actual PCE address (e.g., for security/privacy reasons) thus truly hiding the PCE identity from the requesting node.

Figure 6:
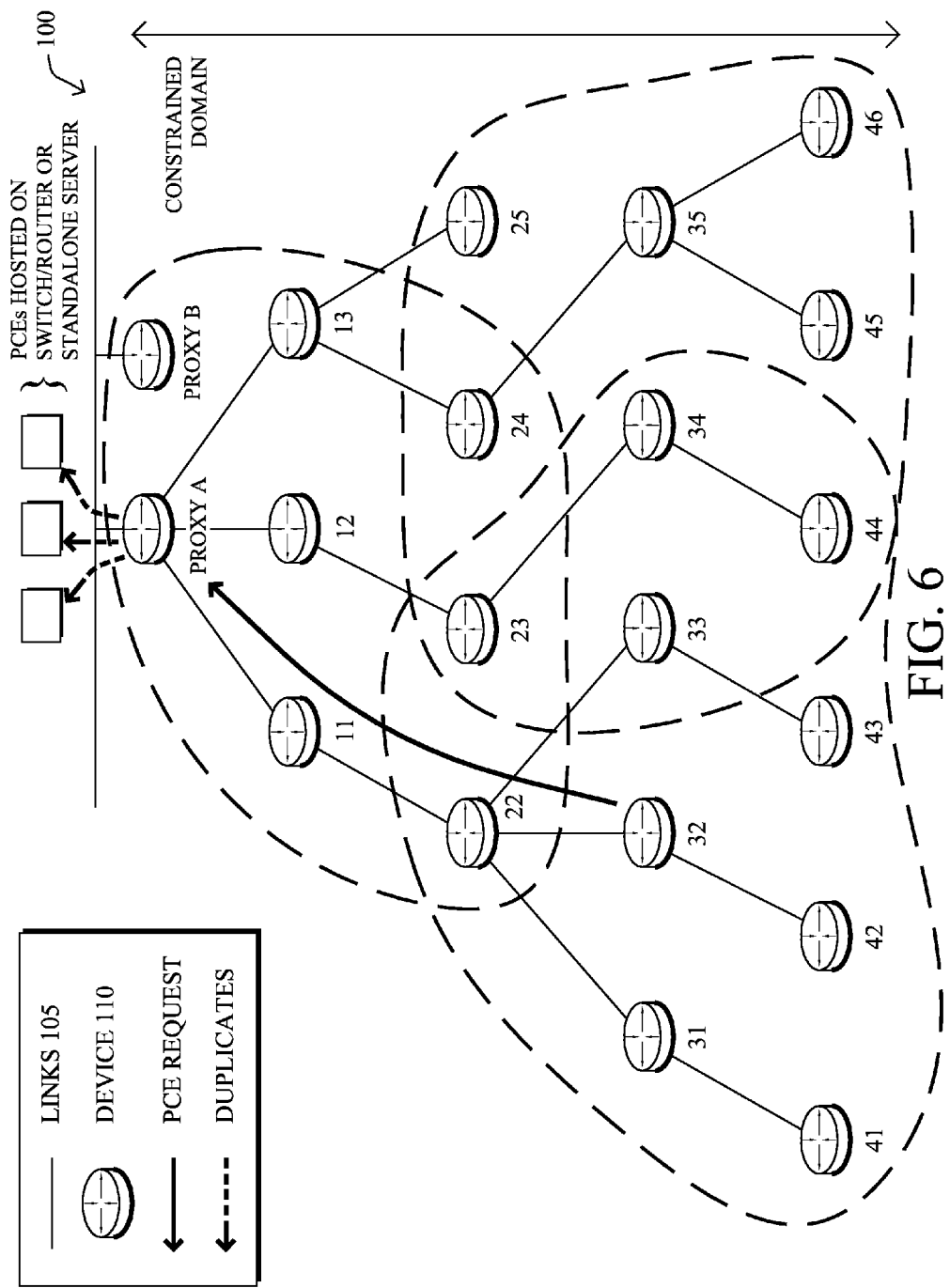
FIG. 6 illustrates an example PCE request replicating.

A third aspect of the techniques herein relates to the processing of path computation requests and also state updates. In existing PCE-based environments, a PCC sends a request to a selected PCE. According to one or more particular embodiments herein, however, the proxy/agent receives the request, and intelligently redirects the request as described above. In a lossy environment (e.g., LLNs), however, a request may be lost. In conventional architectures, requests may be sent to a set of PCEs (stateful or stateless), though in constrained networks, this is ill-advised because of the extra overhead of signaling. The techniques herein, therefore, may perform replication at the proxy-level. To that end, the proxy may replicate a request, such as all requests or specifically noted requests (e.g., using a newly-defined flag in the path computation request or information message). For instance, as shown in FIG. 6, upon receiving a request message, the proxy/agent may decide to appropriately replicate the request (or information) toward a set of PCEs. Note that though the proxy may still be in constrained communication with the PCEs, it may still be less expensive (resource intensive) for the node to send one or a small number of request/information messages to one or two proxies, which could themselves duplicate the messages toward the selected set of PCEs. In return, the proxy could select one or more of the replies provided to the set of selected PCEs to which the request has been replicated and forwarded, and may only send that selected reply toward the requesting node.

Figure 7:
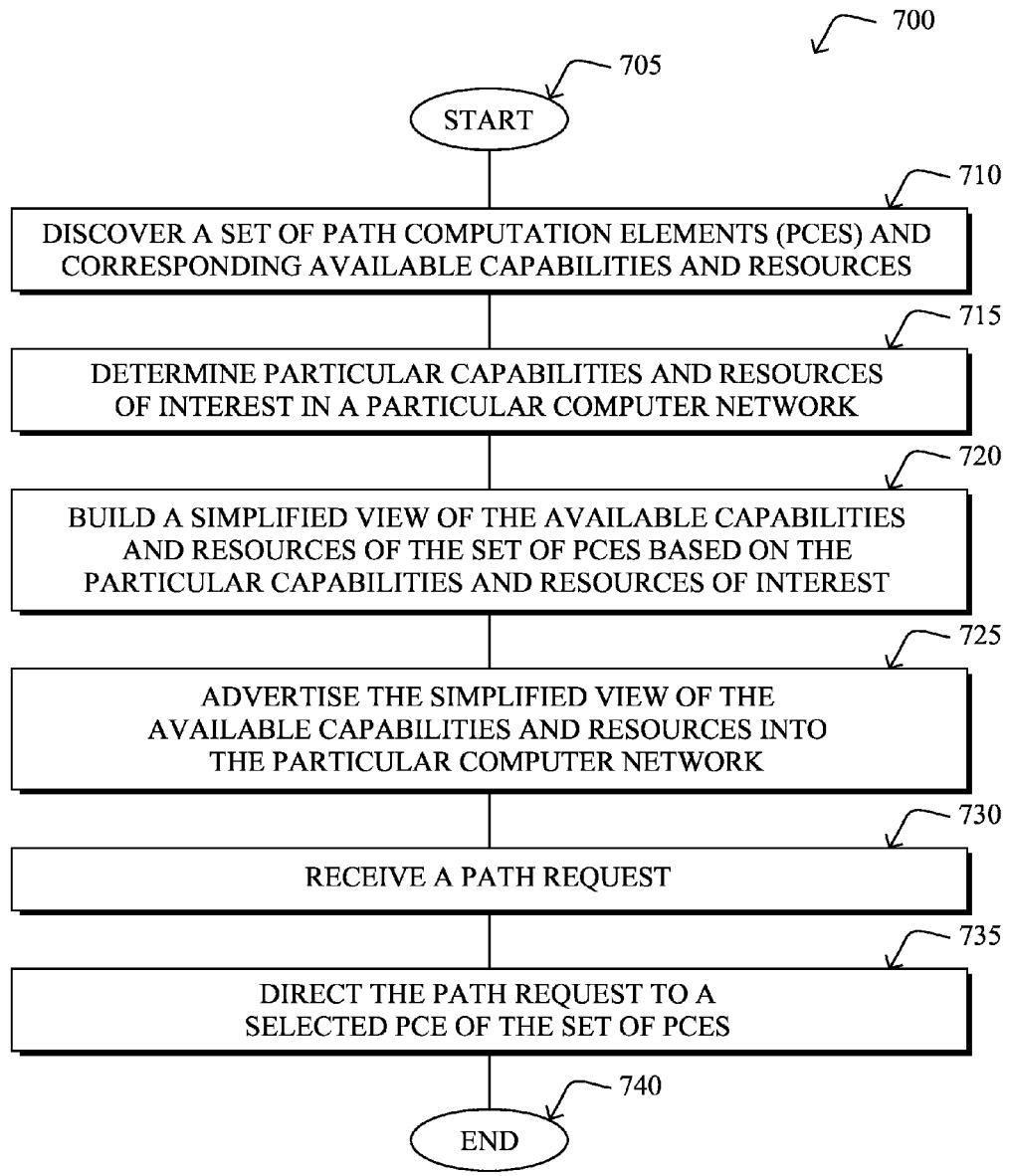
FIG. 7 illustrates an example simplified procedure for PCE proxying, especially in deterministic wireless networks.

FIG. 7 illustrates an example simplified procedure 700 for PCE proxying, especially in deterministic wireless networks, in accordance with one or more embodiments described herein. The procedure 700 may be performed by an agent device, such as a backbone router, a root node of a DAG, a field area router (FAR), a capable node 110, etc. Note that as described above, there may be a plurality of agent devices in a particular computer network (e.g., where each of the plurality of agent devices corresponds to a respective DAG). The procedure 700 may start at step 705, and continues to step 710, where, as described in greater detail above, the agent device discovers a set of PCEs and corresponding available capabilities and resources. Also, in step 715, the agent may determine particular capabilities and resources of interest in a particular computer network (e.g., its LLN), and may correspondingly build a simplified view of the available capabilities and resources of the set of PCEs based on the particular capabilities and resources of interest in step 720. For example, the agent may select a subset of the set of PCEs, such that the simplified view of the available capabilities and resources is of the subset of PCEs. Additionally or alternatively, the agent may include the available capabilities and resources without particular PCE correlation in the simplified view, and/or may generally suppress updates to the available capabilities and resources from the particular computer network, as described above.

In step 725, the agent may advertise the simplified view of the available capabilities and resources into the particular computer network. Accordingly, in step 730, the agent may receive a path request, and in step 735 directs the path request to a selected PCE of the set of PCEs (e.g., selected PCE from a plurality of PCEs of the set of PCEs). Note that as described above, the agent may first process the path request prior to directing the path request (e.g., for the selection, or for other reasons mentioned herein). Also, the agent may replicate (duplicate) the path request to a plurality of selected PCEs of the set of PCEs, and/or may hide the selected PCE from a requesting node for the path request, each as described in greater detail above.

The procedure 700 illustratively ends in step 740, though notably may continue from any suitable step mentioned above, such as discovering new PCEs or PCE updates, dynamically adjusting the capabilities and resources of interest in the network/LLN, receiving new path requests, etc. It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for PCE proxying, especially in deterministic wireless networks. In particular, the techniques herein address the fact that the lossy nature of IoT networks would make PCE discovery and PCC-PCE signaling in multi-PCE environments extremely difficult. According to the techniques herein, however, the complexity of PCE discovery and selection are off-loaded to the proxy (agent device), thus limiting the required overhead, particularly useful for a constrained network. Similarly PCE selection, request, and notification handling are substantially simplified for constrained nodes.

While there have been shown and described illustrative embodiments that provide for PCE proxying, especially in deterministic wireless networks, it is to be understood that various other adaptations and modifications may be made within the spirit and scope of the embodiments herein. For example, the embodiments have been shown and described herein with specific relation to deterministic wireless networks. However, the embodiments in their broader sense are not as limited, and may, in fact, be used with other types of networks and/or protocols, constrained or otherwise. In addition, while certain protocols are shown, such as RPL, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   discovering, by an agent device, a set of path computation elements (PCEs) and corresponding available capabilities and resources, wherein the agent device acts as a proxy for one or more nodes during a PCE selection process;
   determining, by the agent device, particular capabilities and resources of interest in a particular computer network;
   building, by the agent device, a simplified view of the available capabilities and resources of the set of PCEs based on the particular capabilities and resources of interest; and
   advertising, by the agent device, the simplified view of the available capabilities and resources into the particular computer network,
   wherein the agent device acting as the proxy for one or more nodes during the PCE selection process comprises:
   receiving a path request,
   directing the path request to a selected PCE of the set of PCEs, and
   hiding actual locations and states of each of the selected PCE from a requesting node for the path request.

2. The method as in claim 1, further comprising:
   selecting a subset of the set of PCEs, wherein the simplified view of the available capabilities and resources is of the subset of PCEs.

3. The method as in claim 1, further comprising:
   replicating the path request to a plurality of selected PCEs of the set of PCEs.

4. The method as in claim 3, further comprising:
   receiving a plurality of path responses from the plurality of selected PCEs of the set of PCEs; and
   selecting and returning one of the plurality of path responses to a requesting node for the path request.

5. The method as in claim 1, further comprising:
   processing the path request prior to directing the path request.

6. The method as in claim 1, further comprising:
   selecting the selected PCE from a plurality of PCEs of the set of PCEs.

7. The method as in claim 1, wherein building the simplified view comprises:
   including the available capabilities and resources without particular PCE correlation.

8. The method as in claim 1, wherein building the simplified view comprises:
   suppressing updates to the available capabilities and resources from the particular computer network.

9. The method as in claim 1, wherein the agent device is a backbone router; a root node of a directed acyclic graph (DAG); or a field area router (FAR).

10. The method as in claim 9, wherein there are a plurality of agent devices in the particular computer network.

11. The method as in claim 10, wherein each of the plurality of agent devices corresponds to a respective DAG.

12. An apparatus, comprising:
    one or more network interfaces to communicate with a particular computer network and with one or more path computation elements (PCEs);
    a processor coupled to the network interfaces and adapted to execute one or more processes; and
    a memory configured to store a process executable by the processor, the process when executed operable to:
    discover a set of PCEs and corresponding available capabilities and resources;
    determine particular capabilities and resources of interest in the particular computer network;
    build a simplified view of the available capabilities and resources of the set of PCEs based on the particular capabilities and resources of interest; and advertise the simplified view of the available capabilities and resources into the particular computer network, wherein the apparatus is an agent device that acts as a proxy for one or more nodes during a PCE selection process, wherein the agent device acting as the proxy for one or more nodes during the PCE selection process comprises:

receiving a path request, directing the path request to a selected PCE of the set of PCEs, and hiding actual locations and states of each of the selected PCE from a requesting node for the path request.

13. The apparatus as in claim 12, wherein the process when executed is further operable to:

select a subset of the set of PCEs, wherein the simplified view of the available capabilities and resources is of the subset of PCEs.

14. The apparatus as in claim 12, wherein the process when executed is further operable to:

replicate the path request to a plurality of selected PCEs of the set of PCEs.

15. The apparatus as in claim 14, wherein the process when executed is further operable to:

receive a plurality of path responses from the plurality of selected PCEs of the set of PCEs; and select and return one of the plurality of path responses to a requesting node for the path request.

16. The apparatus as in claim 12, wherein the process when executed is further operable to:

process the path request prior to directing the path request.

17. The apparatus as in claim 12, wherein the process when executed is further operable to:

select the selected PCE from a plurality of PCEs of the set of PCEs.

18. The apparatus as in claim 12, wherein the process when executed to build the simplified view is further operable to:

include the available capabilities and resources without particular PCE correlation.

19. The apparatus as in claim 12, wherein the process when executed to build the simplified view is further operable to:

suppress updates to the available capabilities and resources from the particular computer network.

20. The apparatus as in claim 12, wherein the agent device is a backbone router; a root node of a directed acyclic graph (DAG); or a field area router (FAR).

21. A tangible, non-transitory, computer-readable media having software encoded thereon, the software when executed by a processor operable to:

discover, at an agent device, a set of path computation elements (PCEs) and corresponding available capabilities and resources, wherein the agent device acts as a proxy for one or more nodes during a PCE selection process;

determine, at the agent device, particular capabilities and resources of interest in a particular computer network;

build, at the agent device, a simplified view of the available capabilities and resources of the set of PCEs based on the particular capabilities and resources of interest; and advertise, from the agent device, the simplified view of the available capabilities and resources into the particular computer network, wherein the agent device acting as the proxy for one or more nodes during the PCE selection process comprises:

receiving a path request, directing the path request to a selected PCE of the set of PCEs, and hiding actual locations and states of each of the selected PCE from a requesting node for the path request.

* * * * *